United States Patent [19]

Truty

[11] Patent Number: 5,319,175
[45] Date of Patent: Jun. 7, 1994

[54] APPARATUS FOR TRANSFERRING ELECTRICAL CURRENT TO AND FROM A MOVING WIRE

[75] Inventor: Thomas J. Truty, South Barrington, Ill.

[73] Assignee: Basix Industries Ltd., Fort Wayne, Ind.

[21] Appl. No.: 995,887

[22] Filed: Dec. 23, 1992

[51] Int. Cl.$^5$ .................... B23H 7/10; B23K 9/00

[52] U.S. Cl. ................... 219/69.12; 219/137.61

[58] Field of Search ............ 219/69.12, 69.13, 137.61; 204/224 M

[56] References Cited

U.S. PATENT DOCUMENTS

| | | |
|---|---|---|
| 2,302,781 | 11/1942 | La Force ................. 219/137.61 |
| 3,463,902 | 8/1969 | Bircher . |
| 3,469,070 | 9/1969 | Bernard et al. . |
| 3,502,841 | 3/1970 | Heer . |
| 3,514,570 | 5/1970 | Bernard et al. . |
| 3,515,845 | 6/1970 | Wildenthaler . |
| 3,531,617 | 9/1970 | Ingram et al. . |
| 3,539,756 | 11/1970 | Schwartzbart et al. . |
| 3,562,842 | 2/1971 | Turnipseed . |
| 3,590,213 | 6/1971 | Caldwell . |
| 3,596,049 | 7/1971 | Ogden . |
| 3,617,688 | 11/1971 | Fogelstrom . |
| 3,632,952 | 1/1972 | Rotolico . |
| 3,639,720 | 2/1972 | Malivoir . |
| 3,652,822 | 3/1972 | Nakamura . |
| 3,689,732 | 9/1972 | Hill . |
| 3,730,136 | 5/1973 | Okada . |
| 3,731,048 | 5/1973 | Ogden, Sr. et al. . |
| 3,746,833 | 7/1973 | Ujiie . |
| 3,783,233 | 1/1974 | dal Molin . |
| 3,789,186 | 1/1974 | Rygiol ..................... 219/130 |
| 3,825,719 | 7/1974 | Jonsson .................. 219/130 |
| 3,826,888 | 7/1974 | Garfield et al. . |
| 3,836,747 | 9/1974 | Wlos . |
| 3,909,585 | 9/1975 | Sanders et al. . |
| 3,936,654 | 2/1976 | Cannata . |
| 4,017,710 | 4/1977 | Watt . |
| 4,122,328 | 10/1978 | Essers et al. . |
| 4,128,754 | 12/1978 | Rathjen, Jr. . |
| 4,193,852 | 3/1980 | Inoue ...................... 219/69.12 |
| 4,282,419 | 8/1981 | Auer ....................... 219/137.61 |
| 4,295,746 | 10/1981 | Hartmann . |
| 4,386,259 | 5/1983 | Nagai et al. . |
| 4,482,797 | 11/1984 | Shiramizu et al. ......... 219/137.61 |
| 4,493,971 | 1/1985 | Nawa et al. . |
| 4,563,569 | 1/1986 | Shiramizu et al. . |
| 4,575,612 | 3/1986 | Prunier . |
| 4,590,358 | 5/1986 | Stol . |
| 4,733,038 | 3/1988 | Girardin ................... 219/69.12 |
| 4,733,052 | 3/1988 | Nilsson et al. . |
| 4,736,085 | 4/1988 | Inoue et al. ............... 219/69.12 |
| 4,945,208 | 7/1990 | Lian ....................... 219/137.61 |
| 4,947,024 | 8/1990 | Anderson . |
| 4,956,541 | 9/1990 | Hiltunen . |
| 4,978,831 | 12/1990 | Lian ....................... 219/137.61 |
| 4,988,846 | 1/1991 | Karlsten et al. . |
| 5,081,334 | 1/1992 | Copher et al. . |
| 5,101,093 | 3/1992 | Matsui et al. .............. 219/137.61 |

FOREIGN PATENT DOCUMENTS 63-278724  11/1988  Japan ................ 219/69.12
488677   1/1976  U.S.S.R. ............ 219/69.12

OTHER PUBLICATIONS

Mitsubishi EDM brochure, "Highest Quality Mitsubishi Replacement Parts" No Publication date.
Intech EDM, "Electrotools" Products, pp. 102-108 dated Nov. 1990.

Primary Examiner—Geoffrey S. Evans
Attorney, Agent, or Firm—George Pappas

[57] ABSTRACT

An apparatus for placing current on a moving wire electrode traveling between two points. An electrically conductive member having a circular outer surface and a longitudinal axis is provided at an angle from a straight line between the two points and with its circular outer surface in contact with the moving wire. The moving wire contacts the circular outer surface along a curvilinear path. The conductive member is received within a bore of a holder body. The holder body also includes a wire hole which intersects the bore and communicates therewith through an elongate passage. The moving wire electrode is received through the wire hole and slides over the conductive member surface visible from the wire hole. The contact surface is curvilinear shaped. The conductive member may be turned about its longitudinal axis to expose unworn contact surfaces.

24 Claims, 4 Drawing Sheets

APPARATUS FOR TRANSFERRING ELECTRICAL CURRENT TO AND FROM A MOVING WIRE

TECHNICAL FIELD

The present invention relates to the technical field of conveying electrical current between an electric current transfer element and an electrically conductive wire or cable which moves relative to the current transfer element. More specifically, the present invention relates to what are commonly referred to as "current pickups" which are connected to a power source and where the moving wire is caused to rub against the current pickup thus conveying alternating or direct electrical current or pulses either from the pickup to the wire or from the wire to the pickup.

BACKGROUND OF THE INVENTION

Placing electrical current on a moving wire is currently being done in at least the electrical discharge machine and welding industries. One common way of accomplishing this is to provide a current pickup which is generally cylindrically shaped with a bore therethrough and wherein the current pickup bore is offset from the straight line of wire travel. Thus, the taut moving wire electrode rubs against the interior surface of the bore making the necessary electrical contact for transferring current to the moving wire. An example of this type of current pickup is disclosed in U.S. Pat. No. 4,896,013.

In other current pickup devices, the current pickup is merely pushed toward the taut moving wire electrode or is placed in the normal straight line of wire travel and the tension in the wire causes the wire to rub against the current pickup thereby making the necessary electrical contact. A typical current pickup of this character is disclosed in U.S. Pat. No. 4,539,459.

Cylindrical or rod-shaped current pickups have also been used in several prior types of current conveying systems. With respect to such cylindrical/rod current pickups, the traveling wire is positioned and is caused to rub against the rod in a line perpendicular to the axis of the rod. Although a rod placed perpendicular to a moving wire is effective at conveying current, there are major drawbacks therewith. Unless the diameter of the rod is relatively large, the swept contact surface area of the rod is relatively small and the transfer of electrical current becomes inefficient while deformation of the wire is increased. In addition, the small contact surface provided by the perpendicular rod wears quickly thus requiring frequent maintenance to either adjust and provide a new contact surface or to replace the rod altogether. Further yet, increasing the perpendicular rod diameter to a sufficiently large size is undesirable because it is intrusive to other working elements of the system and prevents compact designs.

With respect to all of these types of prior current pickups, the moving wire is caused to slide or rub against an electrically charged surface, thus, transferring the electrical current therethrough to and from the moving wire. Consequently, the surface finish and shape of the current pickup in the area where the wire rubs against the current pickup is critical because electrical current must be effectively transferred while minimizing damage and wear to the wire and current pickup. Some of the most effective contact surface shapes are curvilinear, such as, for example shown in U.S. Pat. No. 4,896,013. The current pickup contact surface shapes are normally machined so as to achieve the correct curvature and surface finish. However, the machining operation is time-consuming and significantly increases the cost of the current pickups.

Accordingly, a need exists for an apparatus that conveys electrical current to and from a moving wire and which is effective at transferring the electrical current while being generally inexpensive to manufacture, efficient in terms of service life and maintenance and which concurrently provides a curvilinear-shaped contact surface.

SUMMARY OF THE INVENTION

It is the principal object of the present invention to overcome the above-discussed disadvantages associated with prior current pickups.

The present invention overcomes the above-mentioned and other disadvantages associated with prior current pickups by providing a rod-shaped or cylindrical pickup at an acute angle with respect to the axis of the wire defined by two points. This axis or normal straight line of travel of the wire is offset so as to intersect the outer surface of the rod and cause the wire to rub thereagainst in a helical or elliptic contact pattern. Accordingly, although the rod diameter is circular and generally small, the contact surface appears elliptical to the wire along its contact length.

Wire guide elements are provided at both ends of the rod and effectively define the axis of the traveling wire. The guide elements which can be pulleys, V-grooved components, hook-shaped components, orifice components, etc., and combinations thereof thus position the wire at an acute angle with respect to the rod and preferably, for maximizing the elliptic contact surface, place it at an angle of 5 to 20 degrees.

More specifically, the present invention overcomes the disadvantages associated with prior current pickups by providing an electrically conductive member such as a rod having a circular outer surface with respect to its longitudinal axis. The rod is received within a bore of a rod holder body. The rod holder body includes a wire receiving hole therethrough at an acute angle from the rod and bore longitudinal axes. The wire receiving hole surface and the bore surface intersect and thereby define a generally straight elongate passage therebetween. The electrically conductive wire to which electrical current is transferred is received through the wire hole and is guided therethrough with two orifice type guide members, one on each side of the wire hole. The passage between the wire hole and the bore is generally parallel to a straight line defined between the guide member bores. This straight line also intersects the electrically conductive rod circular outer surface so that when wire traveling through the two guide bores is made taut, the wire contacts the rod circular outer contact surface along a curvilinear path or, more specifically, along a path defined by a segment of an ellipse.

The angle between the rod longitudinal axis and the straight line defined between the guide members, the offset of the straight line for intersecting the rod outer surface and the rod material can be varied so that in any particular situation, given the wire type, speed, voltage, current, etc., the electrical transfer efficiency may be maximized while minimizing wear on the wire and rod. In this regard, as the angle between the rod longitudinal axis and the straight line between the guide members decreases, the segment of an ellipse defined by the contact surface opens and becomes wider. On the other hand, increasing the angle towards 90 degrees closes the ellipse segment until, at 90 degrees, the contact surface becomes circular. Preferably, the rod is placed at an angle between 5 degrees and 20 degrees.

The rod holder body can be made of a non-electrically conductive material while the rod is preferably made of tungsten. The guide members are preferably the orifice type and are made of diamond. The holder body wire hole increases in diameter away from the rod and toward the guide members to accommodate threading of the wire through the wire hole.

One end of the rod includes a tool receiving recess or slot for receiving a tool and turning the rod about its longitudinal axis. In this fashion, as one curvilinear path contact surface is worn, another similar curvilinear contact surface is provided by merely turning the rod about its axis to expose an unworn portion of the rod outer surface.

Various shapes having a circular outer surface with respect to the longitudinal axis are contemplated for use as conductive current pickup members. Some of these shapes are, in addition to the rod and cylindrical shapes, conical, convex, concave and double cones. As with the rod shape, a longitudinal bore can be provided through the conical, convex, concave and double cone shape current pickup members.

In another embodiment, the electrically conductive rod or other shape member is not received within a bore of a rod holder body but, rather, is pivotally connected at one or both of its longitudinal ends so as to rotate about its longitudinal axis. Thus, in this embodiment, the conductive member is retained in position at an angle with respect to the normal straight line of wire travel by these pivotal connections rather than the bore inner surface such as with respect to the rod embodiment discussed hereinabove.

In one form thereof, the present invention is directed to an apparatus for transferring electrical current to a moving electrically conductive wire traveling between two points. The apparatus includes an electrically conductive member having a circular outer surface with respect to its longitudinal axis. The rod is located with its longitudinal axis at an acute angle from a straight line defined by the two points and with the circular outer surface in contact with the moving wire. The wire contacts the circular outer contact surface along a curvilinear path.

BRIEF DESCRIPTION OF THE DRAWINGS

The above-mentioned and other features and objects of this invention and the manner of obtaining them will become more apparent and the invention itself will be better understood by reference to the following description of embodiments of the invention taken in conjunction with the accompanying drawings wherein.

Corresponding reference characters indicate corresponding parts throughout the several views of the drawings.

Figure 1:
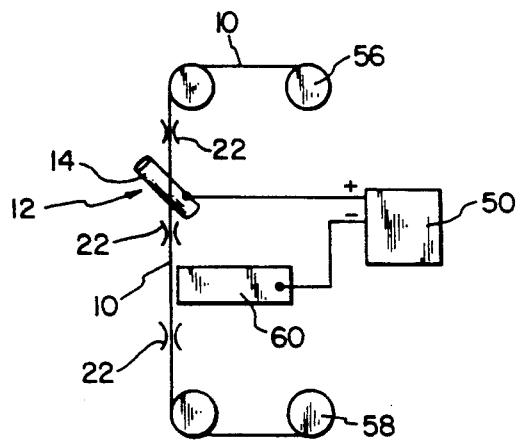
FIG. 1 is a diagrammatic view of an electrical discharge machine incorporating the present invention.

The exemplifications set out herein illustrate preferred embodiments of the invention in one form thereof and such exemplifications are not to be construed as limiting the scope of the disclosure or the scope of the invention in any manner.

DETAILED DESCRIPTION OF SPECIFIC EMBODIMENTS

Referring to the drawings, an apparatus for transferring electrical current to a moving electrically conductive wire 10 is designated by the referenced numeral 12. Apparatus 12 includes an electrically conductive member or rod 14 having a longitudinal axis 16 and a generally circular outer surface 18. Rod 14 is preferably made of tungsten or tungsten carbide and the circular outer surface 18 is generally smooth. Rod 14 can be manufactured by a machine operation or by merely cutting pieces from a longer rod previously formed by rolling, drawing, or other manufacturing processes.

The electrically conductive wire 10 is caused to travel between two points 20 defining a straight line therebetween. This straight line, also referred to as the normal straight line of wire travel, is the path followed by wire 10 when taut and not obstructed in any manner. Wire 10 is caused to travel in this straight line between points 20 through the use of two guide members generally indicated as 22. Guide members 22 are preferably made with a diamond portion 24 through which there is a hole or bore 26. Bore 26 is preferably only slightly larger than the diameter of wire 10 for accurate guiding. Thus, the normal straight line of wire travel, in practice, is the path of wire 10 when traveling between diamond portions 24 through bores 26 and when wire 10 is taut and unobstructed. In theory, points 20 are located at the center of bores 26.

Diamond portions 24 of guide members 22 are mounted in a known and customary manner in guide barrels 28, normally made of sintered or other type of metal. Guide barrels 28 include frusto-conical entries 30 on both sides of diamond portions 24 and converging toward bores 26. Frusto-conical entries 30 are provided for aiding the threading of wire 10 through bores 26. Guide barrels 28 are affixed or otherwise connected to a rod holder body 32 in a known and customary manner, such as by providing corresponding mating threads in rod holder counter bore walls 34 and guide barrel circumferential wall 36 (not shown) and merely screwing guide barrels 28 into counter bores 38 of rod holder body 32.

Figure 6:
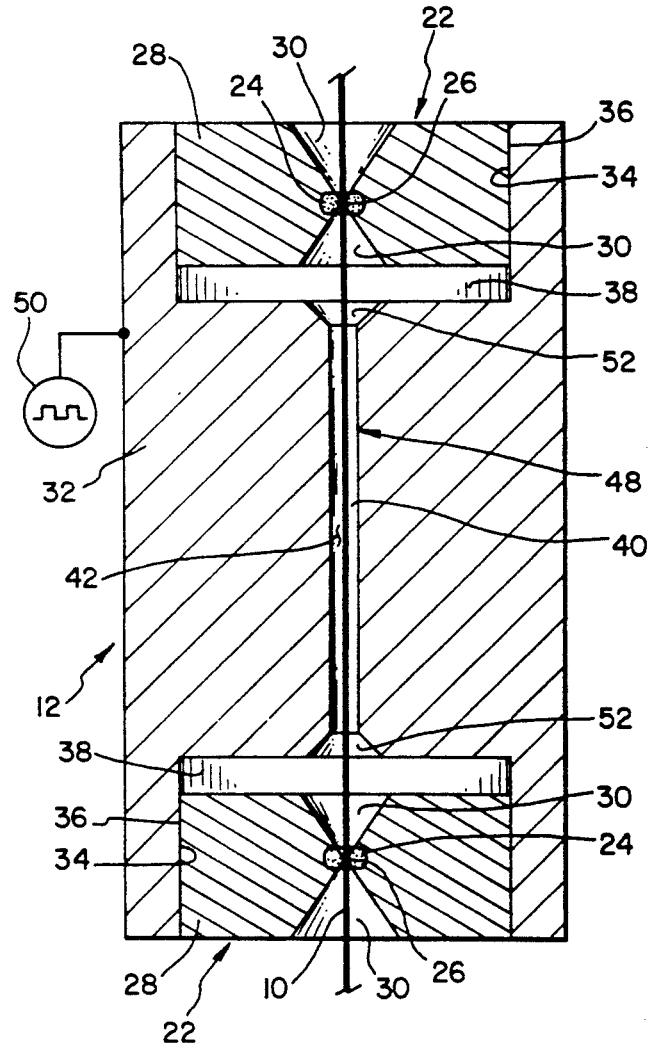
FIG. 6 is a cross sectional view of the conductive member and holder shown in FIG. 5 taken along line 6—6.
Figure 4:
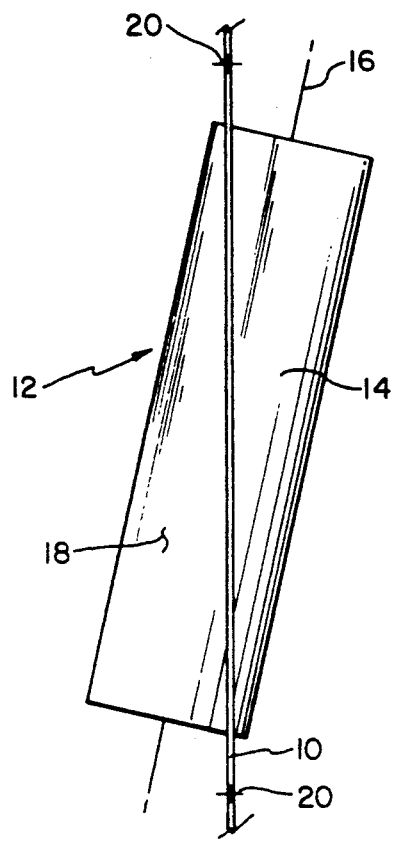
FIG. 4 is a front elevational view of the conductive member and wire shown in FIG. 3.
Figure 5:
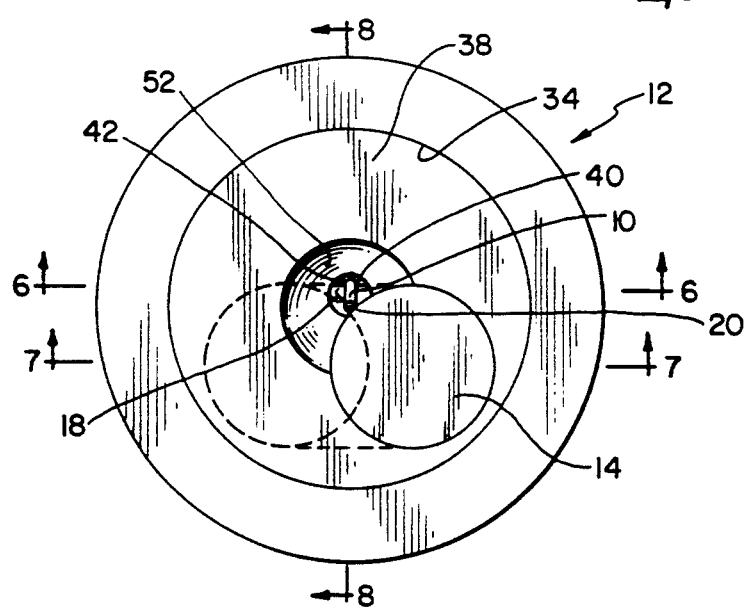
FIG. 5 is a top plan view of an electrically conductive member received within a rod holder according to the present invention.

A wire receiving hole 40 having a wire hole surface 42 is provided generally through the central area of rod holder body 32. As shown in FIGS. 5 and 6, wire 10 travels through wire hole 40. Rod receiving bore 44, having a rod bore surface 46 is also provided in rod holder body 32. Rod receiving bore 44 also has a longitudinal axis (not specifically depicted in the drawings) which is generally colinear with rod longitudinal axis 16 when rod 14 is received therein as shown in FIGS. 5 and 6. Rod longitudinal axis 16 and thus also the longitudinal axis of bore 44 is at an acute angle from the normal straight line of wire travel.

Bore 46 and wire hole 40 intersect or, more specifically, the rod bore surface 46 and the wire hole surface 42 intersect and thereby define a generally straight elongate passage 48 therebetween. It is noted that passage 48 is coplanar with a plane defined by line 6—6 shown in FIG. 5 and being parallel with the normal straight line of wire travel.

Figure 3:
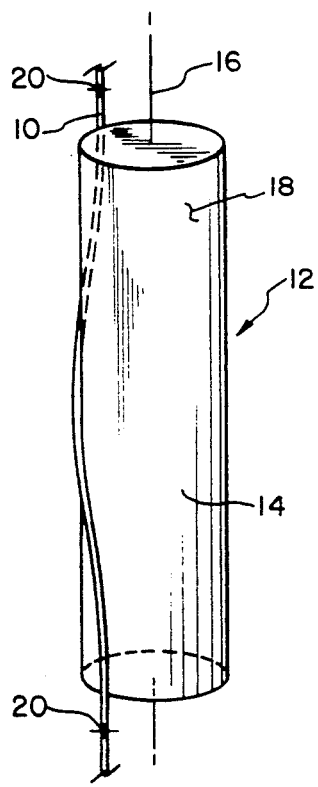
FIG. 3 is a side elevational view of an electrically conductive rod shaped member and moving wire traveling thereover in a curvilinear segment of an ellipse path according to the present invention.
Figure 8:
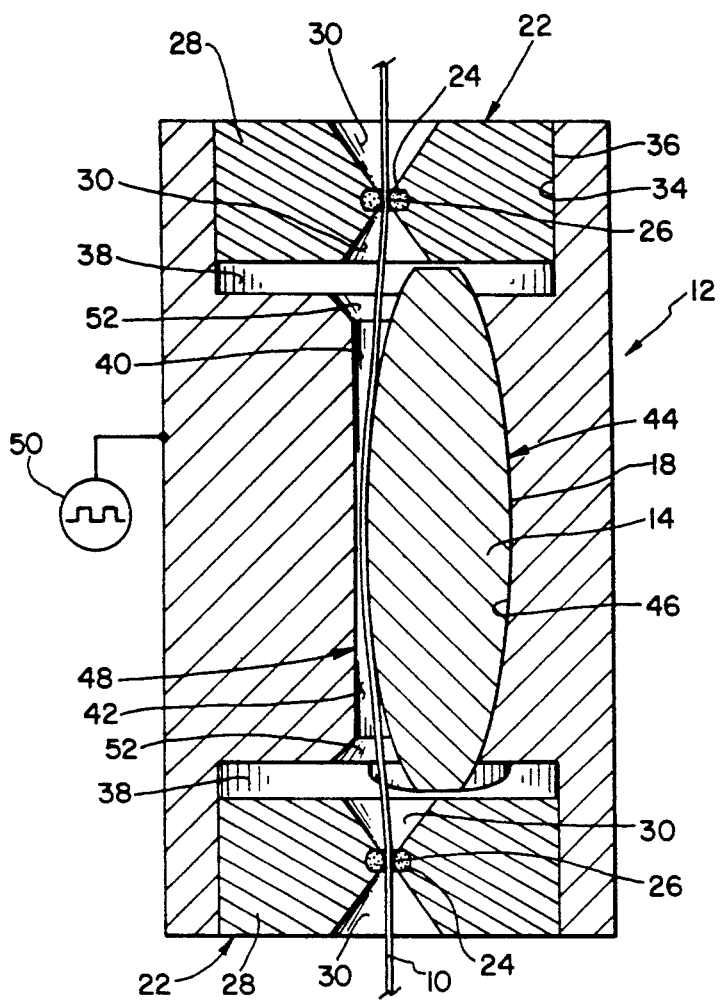
FIG. 8 is a cross sectional view of the conductive member and holder shown FIG. 5 taken along line 8—8.

As more clearly shown in FIG. 5, when rod 14 is inserted within bore 46, a portion of rod surface 18 is visible through wire hole 42 and communicates therewith. This is the contact surface portion over which wire 10 is caused to rub or slide for transferring direct or pulsed electrical current. Furthermore, as more clearly shown in FIGS. 3 and 8, this contact surface is curvilinear and, more specifically, is helically-shaped as a segment of an ellipse. Wire 10 is caused to travel along this curvilinear or ellipse segment path by, as shown in FIGS. 3, 5, and 8, offsetting the normal straight line of wire travel toward rod 14 and so that the normal straight line of wire travel or the line defined between points 20 pierces rod 14. Thus, when wire 20 is made taut between guide members 22, it is forced to come in contact with the curvilinear or ellipse segment shaped surface along rod circular outer surface 18. As can be appreciated, this offset along with the rod diameter and the angle between rod longitudinal axis 16 and the normal straight line of wire travel can be varied for providing various curvilinear contact surface shapes, all of which are generally shaped similar to a segment of an ellipse. By way of example, for electrical discharge machines utilizing wire of 0.25 mm diameter, it is believed a rod diameter of 6 mm and a length of 22 mm, an offset of 1 mm and an angle of 12° 30' between the rod and normal straight line of wire travel maximizes the transfer of current while keeping wear of the wire and the rod surface and deformation of the wire at a minimum.

Pulsed electrical current is normally provided to and from rod 14 from a pulsed or other type of power source 50 connected to rod holder body 32 which is itself conductive and effectively transfers the current to rod 14. In the alternative, rod holder body may be made of a non-conductive material and, in such an embodiment, the power source 50 would be connected directly to rod 14 for ultimately transferring current to and from moving wire electrode 20.

As more clearly shown in FIG. 6, wire hole 40, at each end thereof, is increasing in diameter in the direction away from the contact surface and towards guide members 22. More specifically, frusto conical portions 52 are provided at each end of wire hole 40. Frusto conical portions 52 aid in the threading of wire 10 from a guide member 22 and into wire hole 40.

Figure 7:
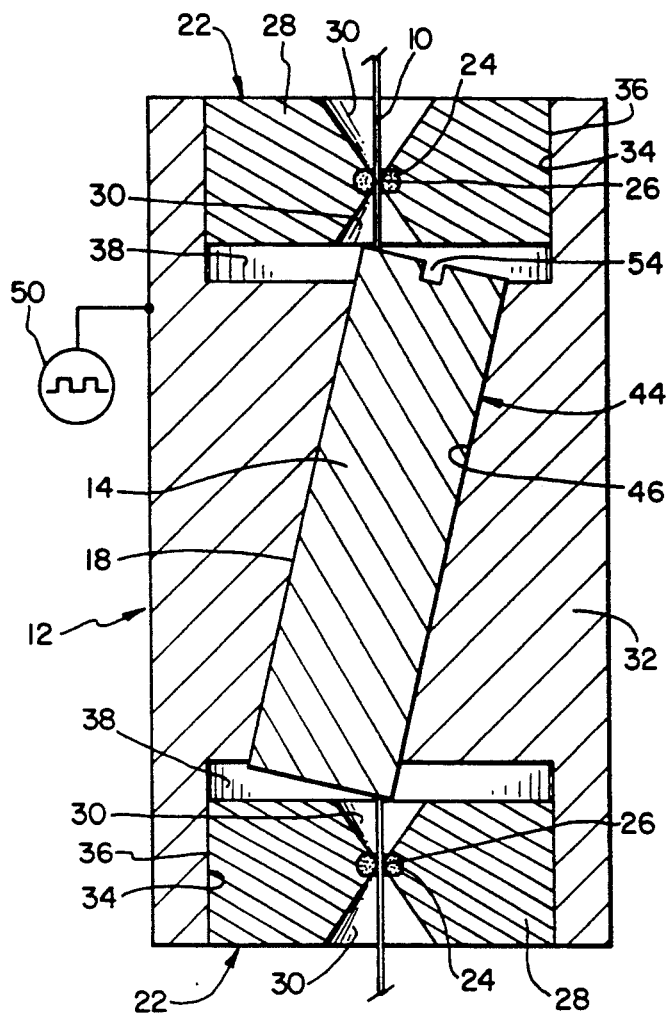
FIG. 7 is a cross sectional view of the conductive member and holder shown in FIG. 5 taken along line 7—7.

Referring now to FIG. 7, one end of rod 14 is provided with a tool receiving recess or slot 54 which is adapted to receive a flat screwdriver or some other suitable similar tool. Accordingly, by inserting a tool within slot 54, rod 14 can be turned about its longitudinal axis 16. In this fashion, as one curvilinear path contact surface is worn, the operator merely turns rod 14 a short radial distance for exposing an unworn portion of the rod outer surface and, thus, providing a brand new unworn surface. This process of exposing unworn portions of the rod outer surface may be repeated until all or substantially all of the rod outer surface 18 is worn beyond effective use and at such time the worn rod is removed from holder 32 and replaced by a new rod. The tool receiving recess slot 54 can be replaced by many different tool receiving shapes for providing the necessary turning force with a tool and turning rod 14 about its longitudinal axis.

Figure 9:
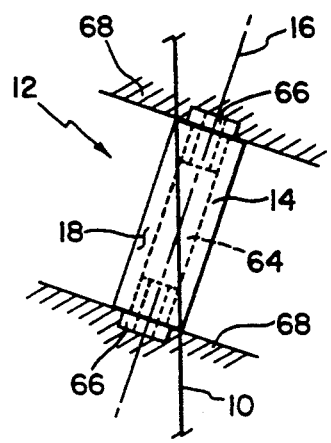
FIG. 9 is a side elevational view of an electrically conductive member depicting another means of retaining the member at an angle with the wire; and, FIG. 10a through 10e are side elevational views of some contemplated electrically conductive members having a circular outer surface with respect to their longitudinal axis.

The preferred embodiment, as shown in FIGS. 2-8 and discussed hereinabove, utilizes a rod or cylindrical shaped electrically conductive member 14 for providing a contact surface with the wire. In this embodiment, rod 14 is retained within rod receiving bore 44 and is turned therein about its longitudinal axis for exposing unworn surfaces. In another embodiment, as shown in FIG. 9, a cylindrical rod 14 includes a bore 64 therethrough and further includes end bearing caps 66 at each end thereof. End bearing caps 66 are received within recesses (not shown) of a holding body 68 and, thus, rod or cylindrical member 14 is free to pivot about its longitudinal axis 16. In addition, longitudinal axis 16 is at an acute angle with respect to the normal straight line of wire travel and the contact surface between wire 20 and the circular outer surface 18 appears curvilinear or as a segment of an ellipse to the wire along its contact length. As can be appreciated, a means for turning the rod or cylindrical member about its longitudinal axis similar to that discussed hereinabove is contemplated and may be employed with this embodiment.

Figure 10A:
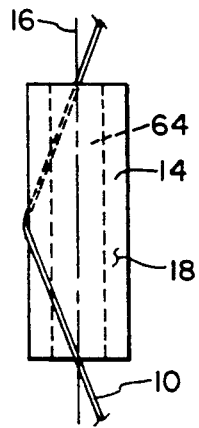
Figure 10B:
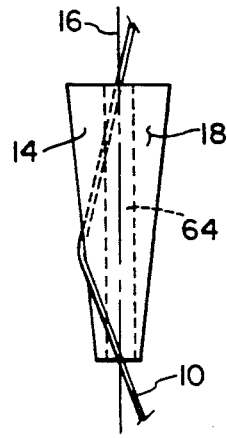
Figure 10C:
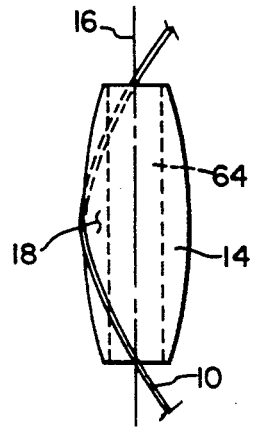
Figure 10D:
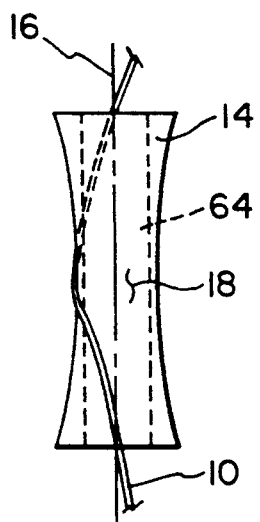
Figure 10E:
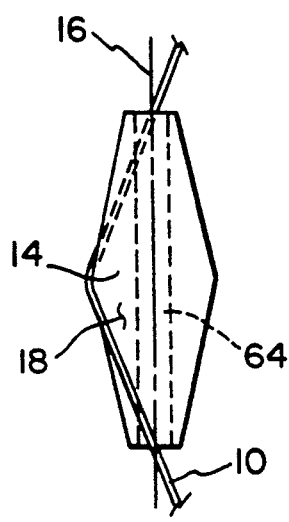

Various other contact surface shapes are contemplated and may be used by the electrically-conductive member 14. In this regard, the most preferred shape is a rod as shown in FIGS. 3-8. Some other contemplated shapes having a longitudinal axis and having a circular outer surface with respect to the longitudinal axis are shown in FIGS. 10a-10e. In FIG. 10a, there is depicted a rod shape with a longitudinal bore (cylindrical). FIG. 10b shows a conical outer surface; FIG. 10c shows a convex outer surface; FIG. 10d shows a concave outer surface; and, FIG. 10e shows a double cone outer surface. In all of these electrically conductive member shapes, the outer surface is circular with respect to the longitudinal axis. More specifically, with all of these shapes, a plane perpendicular to the longitudinal axis and intersecting the conductive member creates a circular shape. As with the rod/cylindrical shape, the conductive members of FIGS. 10b-10e can also be provided with a longitudinal bore for pivotal mounting as shown in the embodiment of FIG. 9 and, also for decreasing the amount of material needed in forming the conductive member. It is noted that the outer surface 18 of all of these shapes forming a current conductive member 14, except for that of FIG. 10e, provides a contact surface for the wire 10 that is curvilinear and, more specifically, helical shaped.

Figure 2:
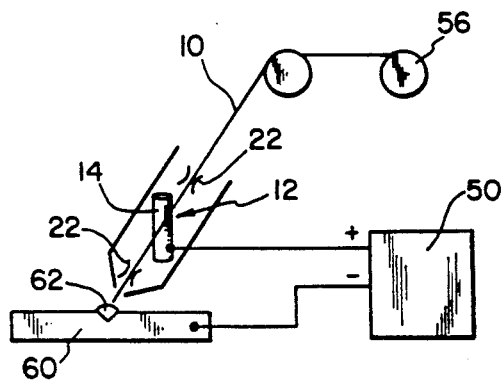
FIG. 2 is a diagrammatic view of a welder incorporating the present invention.

It is contemplated that apparatus 12 may be utilized for transferring electrical current to a moving wire used in at least electrical discharge machines as diagrammatically depicted in FIG. 1 and welding machines as diagrammatically depicted in FIG. 2. In electrical discharge machines, electrical current is placed on wire 10 as it is unwound from spool 56 and discarded or again wound on spool 58. Current of opposite polarity is placed on workpiece 60 from power source 50 and, thus, sparks caused between wire 10 and workpiece 60, as wire 10 is moved thereover, causes workpiece 60 to be selectively cut and shaped. A second current pickup can also be used below the workpiece (not shown) for yet more effectively conveying current between the wire 10 and current pickup rods 14. In electrical discharge machines, wire electrode 10 is generally defaced during use in cutting or shaping workpiece 60.

In welding machines as depicted in FIG. 2, electrical current of opposite polarity is again placed on workpiece 60. Here, however, as wire electrode 10 is unwrapped from spool 56, it is normally completely consumed in, for example, forming weld bead 62. Apparatus 12 can, for example, be used in metal inert gas (mig) welding machines.

While the invention has been described as having specific embodiments, it will be understood that it is capable of further modification. This application is therefore intended to cover any variations, uses, or adaptations of the invention following the general principles thereof and including such departures from the present disclosure as come within known or customary practice in the art to which this invention pertains and fall within the limits of the appended claims.

What is claimed is:

1. In an electrical discharge machine, an apparatus for transferring electrical current to and from a moving electrically conductive wire electrode traveling between two points, said apparatus comprising:
   an electrically conductive member having a longitudinal axis, said member having a circular outer surface with respect to said longitudinal axis and located with said longitudinal axis at an acute angle from a straight line defined by the two points and with said circular outer surface in contact with the moving wire, whereby the wire contacts said circular outer contact surface along a curvilinear path.

2. In a welder, an apparatus for transferring electrical current to and from a moving electrically conductive wire welding electrode traveling between two points, said apparatus comprising:
   an electrically conductive member having a longitudinal axis, said member having a circular outer surface with respect to said longitudinal axis and located with said longitudinal axis at an acute angle from a straight line defined by the two points and with said circular outer surface in contact with the moving wire, whereby the wire contacts said circular outer contact surface along a curvilinear path.

3. An apparatus for transferring electrical current to and from a moving electrically conductive wire traveling between two points, said apparatus comprising:
   an electrically conductive member having a longitudinal axis, said member having a circular outer surface with respect to said longitudinal axis and located with said longitudinal axis at an acute angle from a straight line defined by the two points and with said circular outer surface in contact with the moving wire, whereby the wire contacts said circular outer contact surface along a curvilinear path.

4. The apparatus of claim 1 including two guide members, one on each side of said conductive member, said guide members each having a guide bore aligned with and guiding the wire in said straight line defined by the two points.

5. The apparatus of claim 4 wherein said guide members are made of diamond.

6. The apparatus of claim 3 wherein the wire contacts the circular outer contact surface along a path shaped similar to a segment of an ellipse.

7. The apparatus of claim 3 wherein said conductive member is rod shaped and further comprising a rod holder body having a wire receiving hole therethrough defining a wire hole surface and having a rod receiving bore with a longitudinal axis and defining a rod bore surface, said bore longitudinal axis being at an acute angle from said straight line defined by the two points and said rod bore surface intersecting said wire hole surface and defining a generally straight elongate passage therebetween generally parallel to said straight line, said rod received in said bore whereby said wire contact surface along a curvilinear path on said rod circular outer contact surface communicates with said wire hole.

8. The apparatus of claim 7 wherein said rod holder body is made of a non-electrically conductive material.

9. The apparatus of claim 7 wherein said bore longitudinal axis is at an angle less than 20 degrees from said straight line defined by the two points.

10. The apparatus of claim 7 further including two guide members on said rod holder body, one on each end of said wire hole, said guide members each having a guide bore aligned with and guiding the wire in the straight line defined by the two points.

11. The apparatus of claim 10 wherein said guide members are made of diamond.

12. The apparatus of claim 7 wherein each end of said wire hole is increasing in diameter in the direction away from said contact surface.

13. The apparatus of claim 7 further comprising tool receiving means on said rod for receiving a tool and turning said rod about its longitudinal axis whereby the wire may contact another portion of said rod outer contact surface along a similar curvilinear path.

14. The apparatus of claim 7 wherein said rod is made of tungsten.

15. The apparatus of claim 7 wherein the wire contacts the circular outer contact surface along a path shaped similar to a segment of an ellipse.

16. The apparatus of claim 1 wherein said conductive member longitudinal axis is at an angle less than 20 degrees from the straight line defined by the two points.

17. The apparatus of claim 3 wherein said conductive member is made of tungsten.

18. The apparatus of claim 3 further comprising tool receiving means on said conductive member for receiving a tool and turning said member about its longitudinal axis whereby the wire may contact another portion of said member outer contact surface along a similar curvilinear path.

19. The apparatus of claim 3 wherein said conductive member is pivotally connected at one end thereof to a holder, whereby said conductive member may be turned about its longitudinal axis.

20. The apparatus of claim 3 wherein said conductive member outer surface is rod shaped.

21. The apparatus of claim 3 wherein said conductive member outer surface is conical shaped.

22. The apparatus of claim 3 wherein said conductive member outer surface is convex shaped.

23. The apparatus of claim 3 wherein said conductive member outer surface is concave shaped.

24. The apparatus of claim 3 wherein said conductive member outer surface, is double cone shaped.

* * * * *